(12) United States Patent
Deneszczuk et al.

(10) Patent No.: US 10,697,489 B1
(45) Date of Patent: Jun. 30, 2020

(54) SNAP RING HAVING RETENTION FEATURE

(71) Applicant: GM GLOBAL TECHNOLOGY OPERATIONS LLC, Detroit, MI (US)

(72) Inventors: Gregory W. Deneszczuk, Royal Oak, MI (US); Ryan Du Tour, Troy, MI (US); Manuel Martinez Sanchez, Pontiac, MI (US); Jonathan Kline, Waterford, MI (US); Joaquin J. Affonso, III, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 9 days.

(21) Appl. No.: 16/244,485

(22) Filed: Jan. 10, 2019

(51) Int. Cl.
  *F16B 21/18* (2006.01)
  *F16D 13/68* (2006.01)
  *F16D 13/52* (2006.01)
  *F16D 13/64* (2006.01)

(52) U.S. Cl.
  CPC ............ *F16B 21/183* (2013.01); *F16D 13/52* (2013.01); *F16D 13/683* (2013.01); *F16D 2013/642* (2013.01); *F16D 2300/12* (2013.01)

(58) Field of Classification Search
  None
  See application file for complete search history.

(56) References Cited

U.S. PATENT DOCUMENTS

| | | |
|---|---|---|
| 8,337,111 B2 | 12/2012 | Pajewski et al. |
| 9,664,279 B2 | 5/2017 | Pajewski et al. |
| 2014/0023459 A1 | 1/2014 | Ayad |

FOREIGN PATENT DOCUMENTS

| | | |
|---|---|---|
| GB | 1248148 | 9/1971 |
| KR | 20030037337 | 5/2003 |

OTHER PUBLICATIONS

"Double L Snap Ring," Research Disclosure, Aug. 31, 2016.
"Anti-Rotation Feature in a Uniform Cross-Section Snap Ring," Research Disclosure, Jan. 4, 2018.

*Primary Examiner* — Jacob S. Scott

(57) ABSTRACT

A snap ring is configured to retain components within a clutch assembly. The snap ring has an annular body defining an opening through a center thereof. The annular main body defines a distal-facing surface and an opposite proximal-facing surface. A number of retention features extend from the distal-facing surface of the annular main body. Each retention feature has an axially-extending body portion a radially-extending engagement portion. The engagement portion is configured to engage a backing plate. A friction clutch assembly including a snap ring pair is also provided, which includes a clutch snap ring disposed adjacent to the snap ring including the retention features.

20 Claims, 4 Drawing Sheets

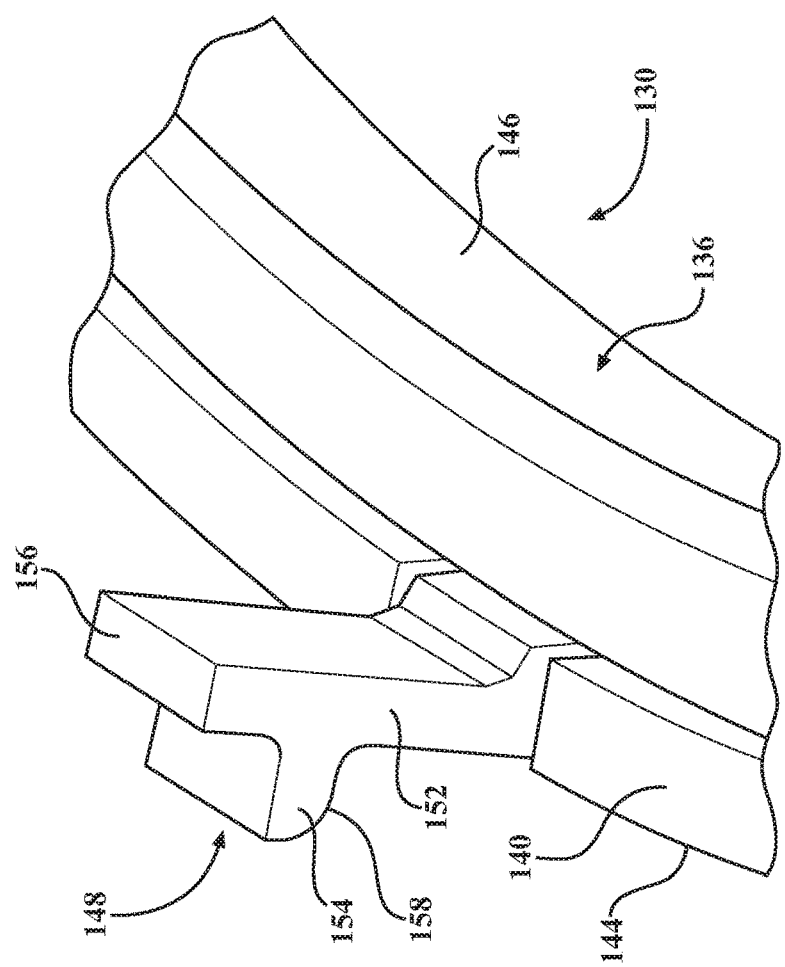
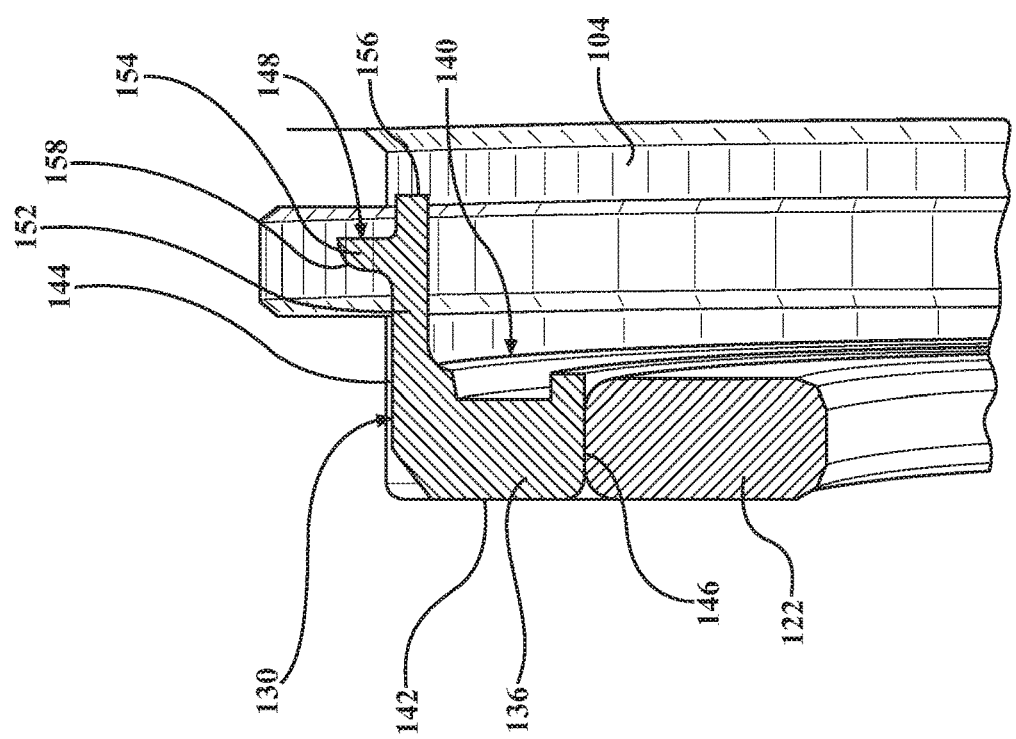
FIG. 5
FIG. 6

SNAP RING HAVING RETENTION FEATURE

FIELD

The present disclosure relates to a snap ring. More specifically, the present disclosure relates to a snap ring for use in a clutch assembly of a motor vehicle.

INTRODUCTION

A typical multiple speed transmission uses a combination of friction clutches, planetary gear arrangements, and fixed interconnections to achieve a plurality of gear ratios. The number and physical arrangement of the planetary gear sets, generally, is dictated by packaging, cost and desired speed ratios.

Friction clutch pack assemblies for engaging and disengaging various gears within a transmission typically include interleaved clutch plates that are compressed against a backing plate. The backing plate is a stiff member against which the clutch plates can be compressed. The backing plate must be able to provide a certain amount of axial stiffness against which the clutch plates can be compressed to provide an effective coupling between the components, and the backing plate must be able to cooperate with the end clutch plate to effectively prevent further axial displacement when the clutch assembly is engaged.

One or more retainer rings or snap rings is used to retain the backing plate axially in place within the friction clutch assembly. A retainer ring or snap ring is typically a substantially circular or annular retaining device having a break or opening which divides the ring into two interconnected curvilinear members. The members may be deflected or flexed to facilitate insertion into a mating groove. Snap rings are constructed to direct a retaining or clamping force along the circumference or periphery of the snap ring when properly inserted onto a component. Specifically, the directional force is most commonly used to retain or clamp together various mating components.

There are generally two styles of snap rings: an internal snap ring employed for applying outwardly-directed clamping force, and an outer snap ring positioned for applying inwardly-directed clamping force. Sometimes multiple snap rings are required, depending on the geometry of the surrounding components.

For example, referring to FIG. 1, an outer snap ring 10 may be used to retain a backing plate 12 to an inner hub 14, but an inner snap ring 16 may be disposed adjacent the outer snap ring 10 to occupy space 18 between the outer snap ring 10 and an inner surface 20 of the backing plate 12, so that the outer snap ring 10 does not substantially open upon experiencing centrifugal forces. An additional inner snap ring 22 may then be used to retain the first inner snap ring 16 in an axial direction A with respect to the backing plate 12. Thus, three different snap rings 10, 16, 22 are used to retain the clutch assembly 24 illustrated in FIG. 1.

SUMMARY

The present disclosure provides a retainer snap ring for retaining another clutch snap ring in a radial direction, while cooperating with the clutch snap ring to retain two members in an axial direction. The retainer snap ring includes a plurality of retention feature extending from an annular main body, which are configured to engage a recess in an adjacent member.

In one form, which may be combined with or separate from the other forms disclosed therein, a snap ring for retaining components within a clutch assembly is provided. The snap ring includes an annular main body defining an opening through a center thereof. The annular main body defines an outer curved surface and an inner curved surface. The annular main body also defines a distal-facing surface and an opposite proximal-facing surface. A number of outer retention features extend from the distal-facing surface of the annular main body. Each outer retention feature has an axially-extending body portion and a radially-extending engagement portion. The engagement portion is configured to engage a backing plate.

In another form, which may be combined with or separate from the other forms disclosed herein, a clutch assembly is provided that includes a number of first clutch plates coupled to an inner member and a number of second clutch plates interleaved with the plurality of first clutch plates and coupled to an outer member. A backing plate is disposed adjacent to an end of the first and second clutch plates. The backing plate defines at least one recess therein. A snap ring pair is provided that is configured to retain the backing plate to one of the inner and outer members. The snap ring pair includes a clutch snap ring contacting one of the inner and outer members and a retention snap ring contacting the clutch snap ring and the backing plate. The retention snap ring defines a distal-facing surface and an opposite proximal-facing surface, and the retention snap ring has a number of retention features extending from the distal-facing surface. Each retention feature has an axially-extending body portion a radially-extending engagement portion. The engagement portions are disposed within one or more recesses of the backing plate. The friction clutch assembly is configured to be moved between an engaged position and a disengaged position. In the engaged position, the first and second members are coupled together by compressing the first and second clutch plates against the backing plate.

In yet another form, which may be combined with or separate from the other form disclosed herein, a snap ring for retaining components within a clutch assembly is provided. The snap ring includes an annular main body defining an opening through a center thereof. The annular main body defines a distal-facing surface and an opposite proximal-facing surface. A number of retention features extend from the distal-facing surface of the annular main body. Each retention feature has an axially-extending body portion and a radially-extending engagement portion. The engagement portion is configured to engage a backing plate.

Additional features may optionally be provided, including but not limited to the following: the body portion extending perpendicular to the engagement portion; the annular main body and the retention features being unitarily formed as one piece; the snap ring being formed of a plastic material; the body portion extending axially beyond the engagement portion in a distal direction and the body portion extending axially beyond the engagement portion in a proximal direction; the engagement portion having a curved surface; the retention features extending from the outer curved surface of the annular main body; a majority of the retention features being disposed equidistant from one another about the annular main body; an actuator disposed on one side of the pluralities of first and second clutch plates; the actuator configured to compress the pluralities of first and second clutch plates into the engaged position; the actuator being one of electric, hydraulic and pneumatic; at least one of the sets of first and second clutch plates including friction material disposed on the faces of the clutch plates; the backing plate being splined to the inner member or the outer member; the clutch snap ring contacting the inner member and being disposed within a spline of the inner member; the retention snap ring defining an outer curved surface and an inner curved surface; and the retention features extending outwardly of the outer curved surface.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of this disclosure. Moreover, in the figures, like reference numerals designate corresponding parts throughout the views. In the drawings:

FIG. 5 is cut-away cross-sectional side view of the clutch snap ring shown in FIG. 2 and the retainer snap ring shown in FIGS. 2-4 with a case shown behind them, according to the principles of the present disclosure; and FIG. 6 is a perspective view of a portion of the retainer snap ring shown in FIGS. 2-5, in accordance with the principles of the present disclosure.

DETAILED DESCRIPTION

The following description is merely exemplary in nature and is not intended to limit the present disclosure, application, or uses.

Figure 2:
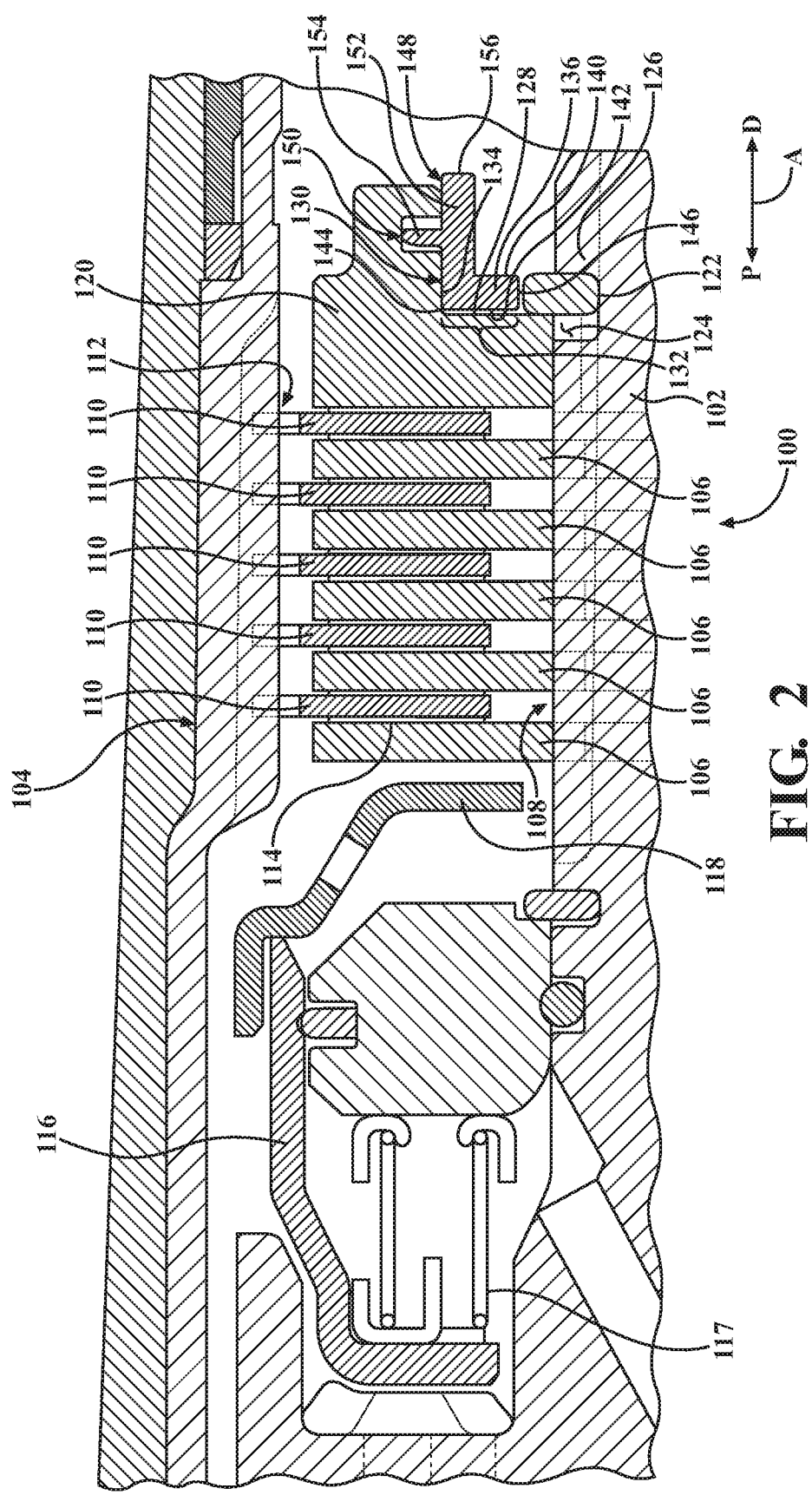
FIG. 2 is a schematic side cross-sectional view of a friction clutch assembly having a snap ring pair including a clutch snap ring and a retainer snap ring, in accordance with the principles of the present disclosure.
Figure 3:
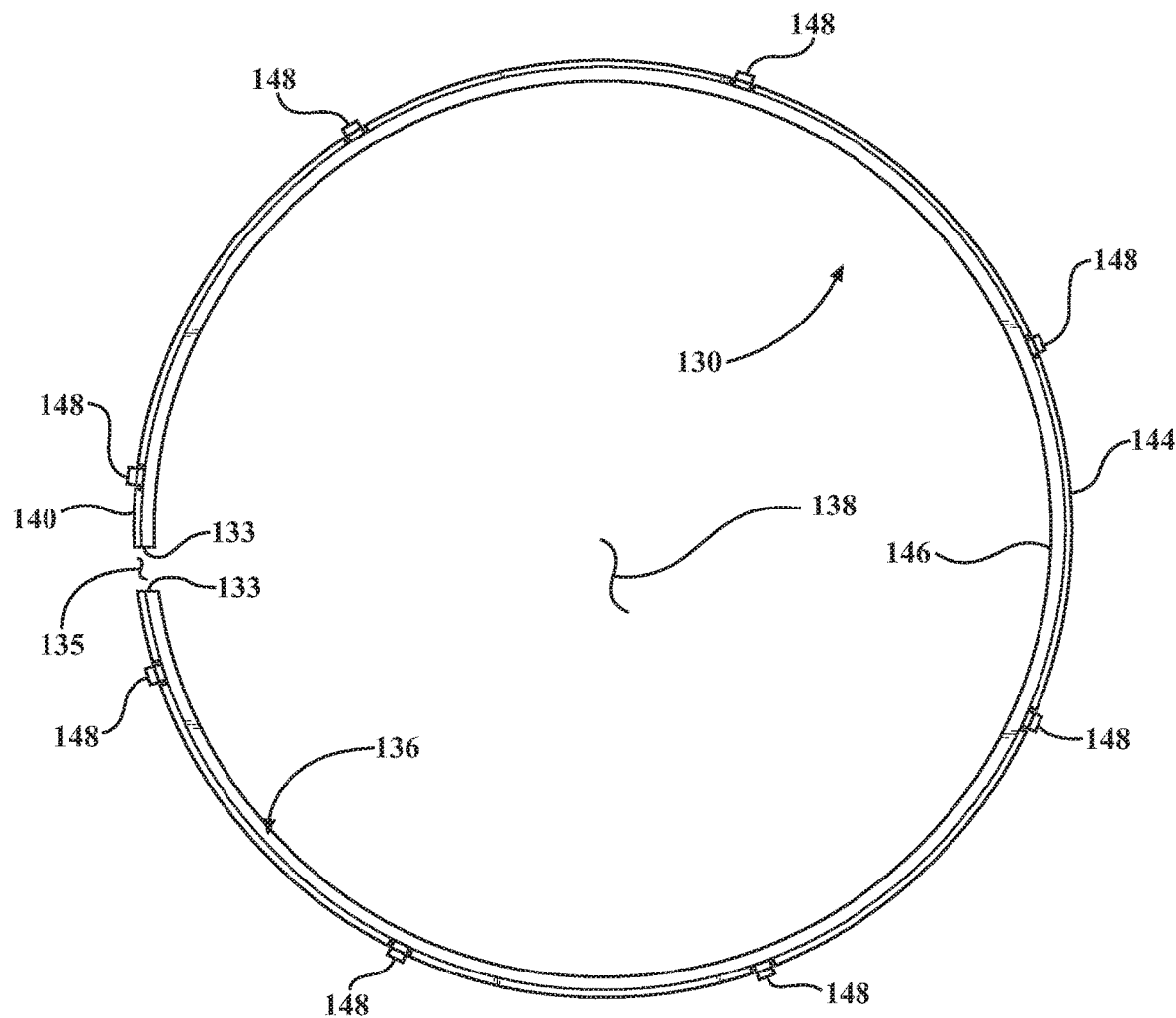
FIG. 3 is an end view of the retainer snap ring of the friction clutch assembly of FIG. 2, according to the principles of the present disclosure.
Figure 4:
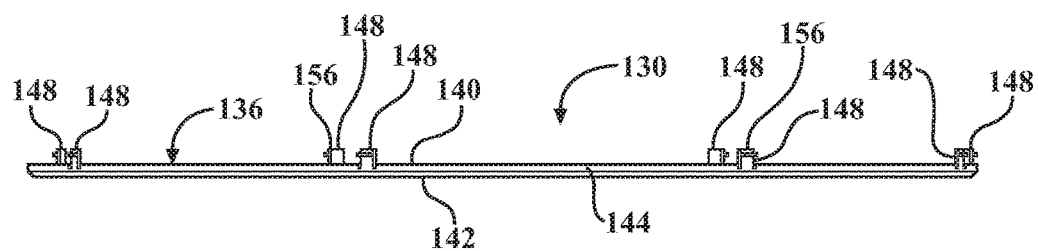
FIG. 4 is a side view of the retainer snap ring shown in FIGS. 2 and 3, in accordance with the principles of the present disclosure.

Referring now to FIG. 2, an illustration of a portion of friction clutch assembly 100 is illustrated, which may be used to selectively interconnect components of an automotive transmission, by way of example. In this example, the friction clutch assembly 100 is operable to selectively interconnect an inner component, such as a hub 102, to an outer component, such as a housing, 104. The housing 104 may be a clutch housing or a transmission case, by way of example. Either component 102, 104 may be rotating or stationary. The friction clutch assembly 100 is operably disposed between the hub 102 and the housing 104, and the friction clutch assembly 100 is configured to selectively couple the hub 102 (and any planetary gear elements, shafts, or stationary elements coupled to the hub 102) to the housing 104 (and any planetary gear elements, shafts, or stationary elements coupled to the housing 104).

The friction clutch assembly 100 includes a first plurality of smaller diameter clutch plates or discs 106 which are coupled by interengaging male and female splines 108 to the hub 102, which is an inner torque carrying member. A second plurality of larger diameter friction clutch plates or discs 110 are coupled by interengaging male and female splines 112 to the clutch housing 104, which is an outer generally annular torque carrying member. The second clutch plates 110 are interleaved with the first clutch plates 106. In accordance with conventional friction clutch practice, at least one face of each of either the first clutch plates 106 or the second clutch plates 110 includes friction material 114 disposed thereon. Typically, the thinner plates 110 are friction clutch plates bearing the friction material 114, and the thicker plates 106 are reaction clutch plates that have smooth faces not containing friction material. However, in some variations, the friction material 114 could also or alternatively be disposed on the reaction plates 106.

At one end of the friction clutch assembly 100 (the left end in the orientation of FIG. 2) is disposed a hydraulic, electric or pneumatic operator or actuator 116 and spring 117, which together engage and disengage the friction clutch assembly 100. An axial compressive force is applied, for example, through an apply plate 118, to the friction clutch assembly 100 to cause torque transfer therethrough and to move the friction clutch assembly 100 into an engaged position. In the illustrated example, when a force is applied to the apply plate 118, the apply plate 118 compresses the first and second clutch plates 106, 110 together.

Figure 1:
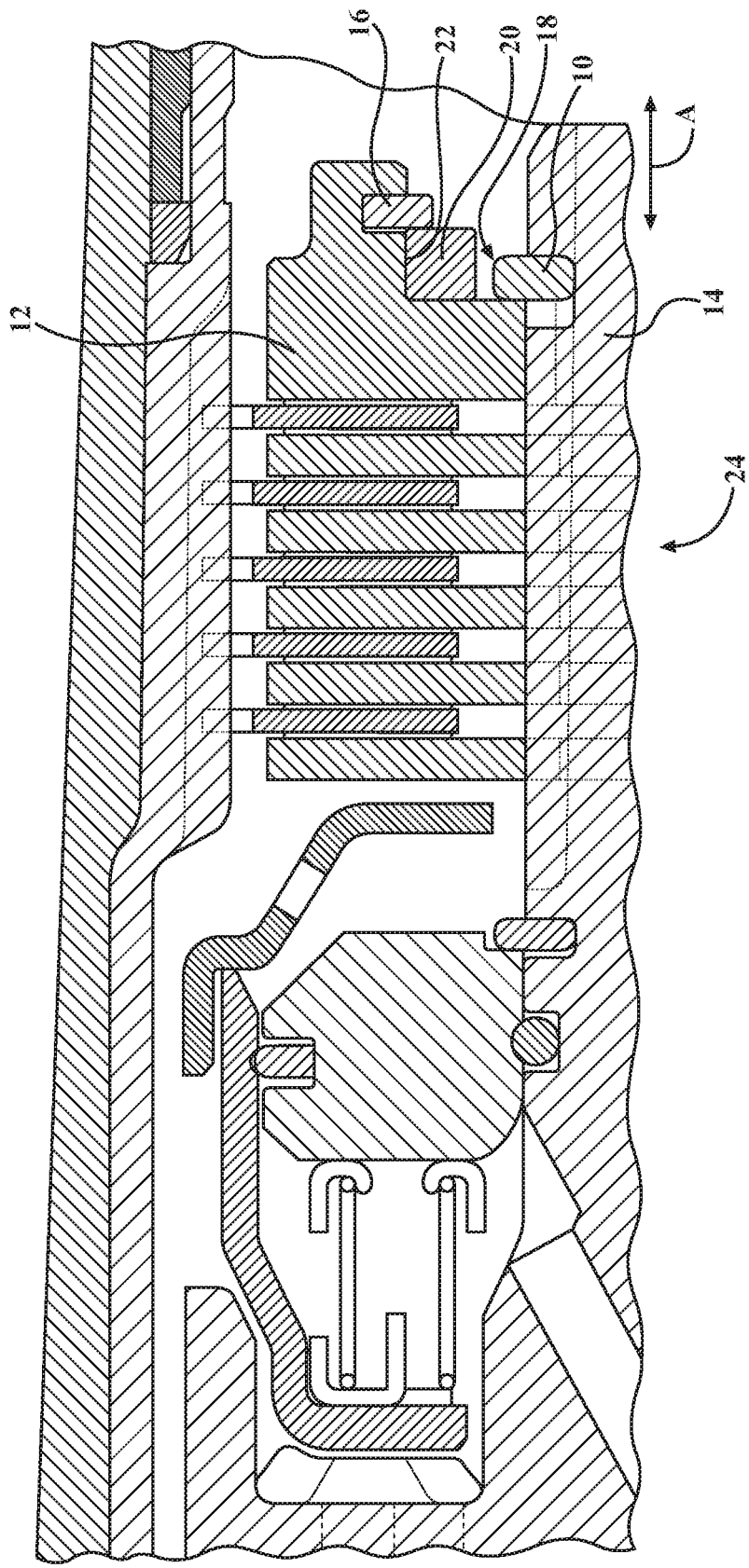
FIG. 1 is a schematic side cross-sectional view of a friction clutch assembly including three snap rings used together to retain the friction clutch assembly.

At the other end of the friction clutch pack or assembly 100 (the right end in the configuration of FIG. 2) is disposed an annular backing plate 120. The backing plate 120 is located and restrained against axial motion away from the apply plate 118 by the clutch snap ring 122. Like the snap ring 10 shown in FIG. 1, the clutch snap ring 122 restrains the clutch assembly 104 against axial movement in the A direction because the clutch snap ring 122 is disposed in a spline or recess 124 formed within the hub 102, and the clutch snap rings abuts a lip 126 of the hub 102 and an axially-facing surface 128 of the backing plate 120.

The clutch snap ring 122 is an outer snap ring configured to apply an inwardly-directed clamping force. However, upon sufficient centrifugal force, the clutch snap ring 122 may move radially outward and could move out of the recess 124. Therefore, an additional retainer snap ring 130 is used to occupy the space 132 between the clutch snap ring 122 and a radially inward facing surface 134 of the backing plate 120, so that the clutch snap ring 122 does not substantially open up upon experiencing applied forces. Due to the unique configuration of the retainer snap ring 130, which will be described in further detail below, no additional inner snap ring (such as the additional snap ring 22 shown in FIG. 1) is needed to axially secure the retainer snap ring 130 to the backing plate 120.

Referring now to FIGS. 3-6, and with continued reference to FIG. 2, the retainer snap ring 130 has an annular main body 136 defining an opening 138 through a center thereof. The annular main body 136 may form a discontinuous ring that has ends 133 defining a break 135 in the ring. The annular main body 136 defines a distal-facing surface 140 and an opposite proximal-facing surface 142. The distal-facing surface 140 and the proximal-facing surface 142 are perpendicular to the central axis of the clutch assembly 100. The distal-facing surface 140 faces in a direction D as shown in FIG. 2, and the proximal-facing surface 142 faces in a direction P as shown in FIG. 2. The annular main body 136 further defines an outer curved surface 144 and an inner curved surface 146.

A plurality of retention features 148 extend from the distal-facing surface 140 of the annular main body 136. In the illustrated example, the annular main body 136 and the plurality of retention features 148 are unitarily formed as one piece; however, it should be understood, that the retention features 148 and the annular main body 136 could be formed as separate pieces and attached together, if desired. To the form the unique shape of the snap ring 130, it may desirable to form the snap ring 130 from a plastic material, for example, nylon or another polyamide. The snap ring 130 may be formed of plastic because it does not retain a large axial load like the clutch snap ring 122. Rather the retainer snap ring 130 withstands only a small axial load within the recess 150, but the retainer snap ring 130 mostly receives only a radially load in the space 132 originating with the clutch snap ring 122.

The retention features 148 are each configured to engage at least one recess 150 defined radially within the backing plate 120. The recess 150 may be formed as one continuous annular recess within the backing plate 120, or individual discontinuous recesses may be formed within the backing plate 120. Each retention feature 148 has an axially-extending body portion 152 and a radially-extending engagement portion 154. In the illustrated example, on each retention feature 148, the engagement portion 154 extends perpendicular to the body portion 152; however, it should be understood that other configurations are possible, such as the engagement portion 154 extending at an angle in the range of 75 to 105 degrees with respect to the body portion 152. The body portion 152 extends perpendicular to the central axis of the clutch assembly 100, in the illustrated example.

In the illustrated example, the engagement portion 154 is configured to engage the backing plate 120 by extending into the recess 150 of the backing plate 120. In the illustrated example, the plurality of retention features 148 extend outwardly of the outer curved surface 144 and into the recess 150 when the snap ring 130 is installed. However, in a configuration where the backing plate 120 is located on an inner spline, the retention features 150 would face in an inward direction and be disposed inward of an inner curved surface of the snap ring 130. In other variations, the recess 150 could be located in a clutch housing or transmission case, instead of within the backing plate 120.

The retention features 148 extend distally outward of the distal-facing surface 140 of the annular main body 136 in a distal direction D along the axis A. In other words, the retention features 148 extend from the distal-facing surface 140 in the distal direction D. The distal direction D extends away from the actuator 116, and a proximal direction P extends toward the actuator 116 along the axis A.

In the illustrated example, the body portion 152 extends axially beyond the engagement portion 154 in the distal direction D, and, in addition, the body portion 154 extends axially beyond the engagement portion 154 in the proximal direction P. Thus, the body portion 154 extends beyond the engagement portion 154 along both sides of the engagement portion 154. As such, a tool can be used to easily grab the distal ends 156 of the body portion 152 and compress the distal ends 156 toward one another to move the engagement portions 154 inward and out of the recess 150 of the backing plate 120 to disengage the snap ring 130. The engagement portion 154 may have a curved surface 158, or an angled or sloped surface (not shown), to assist with moving the engagement portion 154 into the recess 150.

A majority of the retention features 148 are disposed equidistant from one another about the annular main body 136 (see FIG. 3), however, the retention features 148 disposed adjacent to the discontinuous portion of the snap ring 130 defined by the ends 133 may be disposed a different distance from each other than the distance between the rest of the retention features 148, by way of example.

Thus, the retainer snap ring 130 provides the ability to retain the external clutch snap ring 122 that experiences high RPM conditions while still ensuring manufacturability, ease of assembly, reduced mass, reduced complexity, fewer parts, and improved system balance through a self-centering design and optimization of material distribution. The segmented retention features 148 provide for ease of assembly and disassembly. A third snap ring 22 is no longer required.

The description of the disclosure is merely exemplary in nature and variations that do not depart from the gist are intended to be within the scope of the present disclosure. Such variations are not to be regarded as a departure from the spirit and scope of the present disclosure.

What is claimed is:

1. A snap ring for retaining components within a clutch assembly, the snap ring comprising:
   an annular main body defining an opening through a center thereof, the annular main body defining an outer curved surface and an inner curved surface, the annular main body defining a distal-facing surface and an opposite proximal-facing surface; and
   a plurality of outer retention features extending from the distal-facing surface of the annular main body, each outer retention feature having an axially-extending body portion and a radially-extending engagement portion, the engagement portion being configured to engage a backing plate.

2. The snap ring of claim 1, the body portion extending perpendicular to the engagement portion.

3. The snap ring of claim 1, the annular main body and the plurality of outer retention features being unitarily formed as one piece.

4. The snap ring of claim 1, the snap ring being formed of a plastic material.

5. The snap ring of claim 1, the body portion extending axially beyond the engagement portion in a distal direction and the body portion extending axially beyond the engagement portion in a proximal direction.

6. The snap ring of claim 1, wherein the engagement portion has a curved surface.

7. The snap ring of claim 1, the plurality of retention features extending outwardly of the outer curved surface.

8. The snap ring of claim 1, a majority of the plurality of retention features being disposed equidistant from one another about the annular main body.

9. A clutch assembly comprising:
   a plurality of first clutch plates coupled to an inner member;
   a plurality of second clutch plates interleaved with the plurality of first clutch plates and coupled to an outer member;
   a backing plate disposed adjacent to an end of the pluralities of first and second clutch plates, the backing plate defining at least one recess therein; and
   a snap ring pair configured to retain the backing plate to one of the inner and outer members, the snap ring pair comprising:
      a clutch snap ring contacting one of the inner and outer members; and
      a retention snap ring contacting the clutch snap ring and the backing plate, the retention snap ring defining a distal-facing surface and an opposite proximal-facing surface, the retention snap ring having a plurality of retention features extending from the distal-facing surface, each retention feature having an axially-extending body portion and a radially-extending engagement portion, the engagement portions being disposed within the at least one recess of the backing plate, wherein the friction clutch assembly is configured to be moved between an engaged position and a disengaged position, wherein in the engaged position, the first and second members are coupled together by compressing the pluralities of first and second clutch plates against the backing plate.

10. The friction clutch assembly of claim 9, wherein the body portion of each retention feature extends perpendicular to the engagement portion of the respective retention feature.

11. The friction clutch assembly of claim 9, the retention snap ring being formed of a plastic material.

12. The friction clutch assembly of claim 9, wherein the body portion of each retention feature extends axially beyond the engagement portion of the respective retention feature in a distal direction, and the body portion extends axially beyond the engagement portion of the respective retention feature in a proximal direction.

13. The friction clutch assembly of claim 9, wherein the engagement portion of each retention feature has a curved surface.

14. The friction clutch assembly of claim 9, a majority of the plurality of retention features being disposed equidistant from one another about the retention snap ring.

15. The friction clutch assembly of claim 9, further comprising an actuator disposed on one side of the pluralities of first and second clutch plates, the actuator configured to compress the pluralities of first and second clutch plates into the engaged position, the actuator being one of electric, hydraulic and pneumatic, and wherein at least one of the pluralities of first and second clutch plates includes friction material disposed on faces of the respective clutch plates.

16. The friction clutch assembly of claim 9, the backing plate being splined to one of the inner and outer members.

17. The friction clutch assembly of claim 9, the backing plate being splined to the inner member, the clutch snap ring contacting the inner member and being disposed within a recess of the inner member, the retention snap ring defining an outer curved surface and an inner curved surface, the plurality of retention features extending outwardly of the outer curved surface.

18. A snap ring for retaining components within a clutch assembly, the snap ring comprising:

an annular main body defining an opening through a center thereof, the annular main body defining a distal-facing surface and an opposite proximal-facing surface; and a plurality of retention features extending from the distal-facing surface of the annular main body, each retention feature having an axially-extending body portion and a radially-extending engagement portion, the engagement portion being configured to engage a backing plate.

19. The snap ring of claim 18, wherein the body portion extends perpendicular to the engagement portion, the snap ring being formed of a plastic material.

20. The snap ring of claim 18, wherein the body portion extends axially beyond the engagement portion in a distal direction, and the body portion extends axially beyond the engagement portion in a proximal direction.

* * * * *